Figure 1:
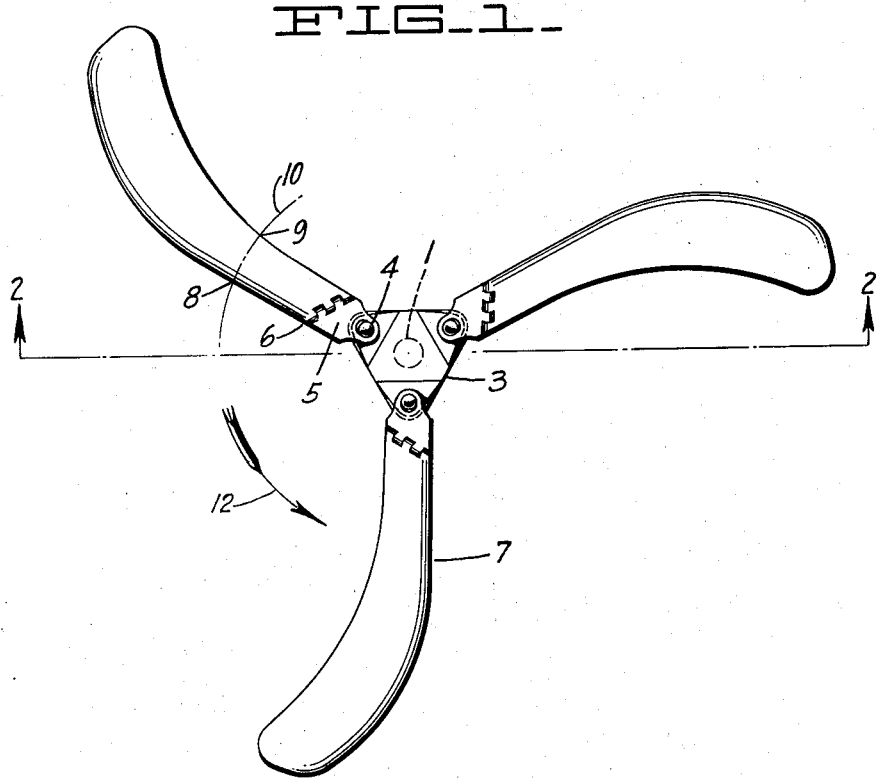

Oct. 29, 1940.     H. T. AVERY     2,219,288

ROTATIVE WING AIRCRAFT

Filed Jan. 13, 1936

INVENTOR.
Harold T. Avery
BY
ATTORNEY.

Patented Oct. 29, 1940

2,219,288

UNITED STATES PATENT OFFICE 2,219,288

ROTATIVE WING AIRCRAFT

Harold T. Avery, Oakland, Calif.

Application January 13, 1936, Serial No. 58,917

15 Claims. (Cl. 244—18)

This invention relates to improvements in the blade and hinge arrangements of rotative wing aircraft with particular reference to craft on which the wing systems are alternatively self-rotative or power driven.

In my Patent Number 1,993,701 there is disclosed a hinge system for rotative wing aircraft in which each blade or wing is hinged to the rotor hub by a single hinge set at an acute angle to the axis of the wing and so angled in elevation as to automatically change the incidence of the wings into and out of the autorotative range of incidence angles in response to the power applied to the rotor and the condition of vertical movement of the craft. There is also disclosed in that patent an alternative double hinge arrangement for each blade including means responsive to the application of power to the rotor for altering the angle of the hinges. In the single hinge arrangement whatever resultant of the forces acting on any blade is effective in the plane containing the hinge and the blade axis, will tend to set up stresses in the hinge and bending moments in the blade. The same is true of the other form disclosed in said patent except that the stresses are limited by the strength of the springs.

While the aforesaid hinge arrangements also cause the incidence angles of the blades to be automatically varied to better suit varying flight conditions, the incidence is varied by substantially the same amount at all points in the length of the blade. To best suit flight requirements, however, the variation should be much greater near the roots than near the tips of the blades, for the reason that rotational velocity is so much greater near the tips than near the roots, that changes in the vertical speed of the craft are proportionately much smaller with respect to the horizontal air speed of elements of the blades near the tips thereof, and therefore a much smaller change in the relative angles of air flow is produced near the tips than near the roots of the blades.

One of the objects of the present invention is to provide a hinge system which will automatically vary the incidence angles of the blades into and out of the range of self rotation, as in the case of the hinge system of the patent above referred to, and will provide for the automatic changing of hinge angle, as in the alternative form of hinge arrangement referred to in the aforesaid patent, but which will be very much simpler than any such arrangement as previously disclosed.

Another object of the invention is to eliminate any tendency of net moments in the plane of rotation of the hinge and blade axis to set up undue stresses in the hinge or bending moments in the blade.

Another object of the invention is to provide a blade and hinge system which will act automatically to vary the incidence angles of the blades by greater amounts near the roots of the blades than near their tips, thereby maintaining the angles of attack of the blades more nearly constant throughout their lengths, under widely different flight conditions.

Another object of the invention is to provide rotative wing aircraft with a hinge system including a plurality of means for automatically changing the incidence angles of the blades, which means cooperate with each other differently in vertical than in horizontal flight and make it possible to obtain a different net change of incidence under each of the two conditions of flight.

Figure 2:
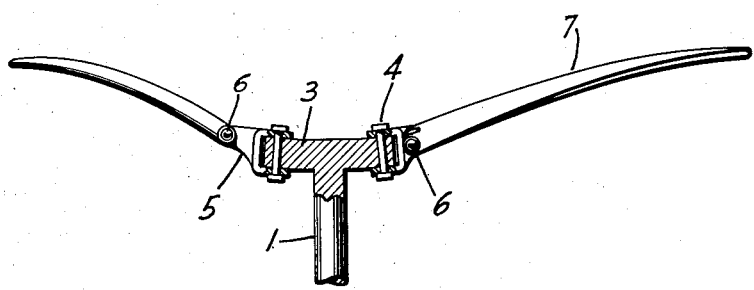

The general principles of the invention will be best understood from the following description of a preferred embodiment thereof, reference being had to the accompanying drawing, in which:

Figure 1 is a plan view of a rotative wing system, embodying the present invention; and Figure 2 is a vertical section taken substantially on line 2—2 of Figure 1.

In the drawing, 1 designates the rotor shaft, which may be connected to the engine of the craft on which it is mounted by means of any well known clutch, either free wheeling or manually operated, substantially as disclosed in my patent above referred to, in such a manner as to drive the rotor in the direction indicated by arrow 12. At the upper end of shaft 1 is a head block 3, in which are rigidly supported a plurality of hinge pins 4, approximately vertical but with their upper ends slanted inwardly toward the axis of shaft 1.

Attached to each hinge pin 4 is a connecting block 5, free to pivot about hinge pin 4 through a limited angle, as for instance 20° each way from its mean position. Upon reaching the desired limit of its angular movement in either direction a face of block 5 may engage a face of head block 3 either directly, or through a resilient block (not shown) so as to prevent further angular displacement. Supported in the outer end of each block 5 is a second hinge pin 6 inclined at an acute angle to the longitudinal axis of the blade and such that its leading end (in the direction of rotation of arrow 12) lies further outwardly with respect to the blade which it supports than does its trailing end, and also so angled vertically that its leading end stands higher than its trailing end. Attached to each hinge pin 6 is a blade 7 of the usual airfoil shape comprising a blunt leading and relatively sharp trailing edge. Each blade is arranged for free pivotal movement about the hinge pin 6, except that its downward rocking may be limited at a position that brings blade 7 approximately horizontal, by any well known means.

The arrangement is such that as power is applied to shaft 1, blades 7 will tend to lag back to the limit of their range of movement about hinge pin 4 until the entire rotor receives sufficient rotational speed so that centrifugal force acting on the outer part of blade 7 exerts a greater moment tending to advance it about hinge 4 than is exerted by the aerodynamic forces tending to make it lag back of its extreme rear position.

If power is removed from shaft 1, and the rotor allowed to rotate, either under momentum or under aerodynamic forces in flight, the blade will advance to the position in which its center of gravity lies in approximately the plane containing the axis of shaft 1 and the center of hinge 4 for that blade; but if power is applied to shaft 1, blade 7 will lag back until the line of action of centrifugal force on it, which is the perpendicular from its center of gravity to the axis of shaft 1, passes far enough in the rear of hinge pin 4 to produce a moment about said pin 4 equal to the moment being transmitted by shaft 1 to blade 7. Therefore with power applied, blade 7 will lag back with respect to head block 3, while with power off it will advance with respect thereto.

Due to the inward slant of hinge pin 4 this will result in a steepening of the vertical angle of hinge 6 when power is applied and a flattening of the angle when power is removed. This will be apparent when it is considered that any point in swinging about hinge 4 will describe a circular path in a plane so angled that the point will reach its highest level when on the side of hinge pin 4 directly opposite shaft 1, and its lowest level when on the side directly toward shaft 1. Therefore the forward end of hinge 6 will rise slightly as the blade lags, while the rear end thereof will drop, thus steepening the vertical angle of the hinge, and tending to give the blade a steeper incidence angle during the time power is applied than is the case with power off.

In addition to the effect of angular movements of the blade about hinge pin 4 on the incidence angle of the blade, the flapping of the blade about hinge pin 6 produces a change in incidence angle exactly similar to that outlined in my Patent Number 1,993,701 above referred to. Because hinge pin 6 is angled upward toward its leading end, the blade will have a considerable plus incidence if the blade is extended out horizontally from the hinge pin. However, if the blade is rocked upward about hinge pin 6 this incidence angle will be decreased because of the fact that any point in the leading edge of the blade is closer to the axis of hinge pin 6 than is the point of the trailing edge which lies the same distance from the axis of shaft 1, and therefore on the rocking upward of the blade the trailing point will be raised more than the leading point thereby decreasing the incidence angle.

For instance, in Figure 1, point 8 in the leading edge of one of the blades, lies in the same circle of movement about the axis of rotary shaft 1 as does point 9 in the trailing edge of the same blade (the two points lying in circle 10) but because of the fact that the leading end of hinge pin 6 is angled outward, the point 8 will be closer to the axis of hinge 6 than will the point 9 and therefore in any upward rocking of the blade about hinge 6, the point 8 will not be raised as much as the point 9.

As set forth in more detail in my Patent Number 1,993,701 above referred to, blade 7 will be down at low flapping angle when the craft is climbing vertically under power, due principally to the downward component of the relative wind engaging the blade; whereas when the craft is dropping in powerless descent, the blades will be at a comparatively high flapping angle due principally to the upward component of the relative wind and due also to the decrease in centrifugal force incident to any tendency of the blades to slow down below their power driven speed of rotation. We will therefore have a large plus incidence angle during vertical climb and a small plus or slightly negative incidence angle during powerless descent which ideally adapts the blades for the functions they are called upon to perform during these various types of flight. However, in vertical climb the incidence angle near the root of the blade should be considerably steeper than near the tip of the blade because of the fact that the blade elements near the root move through very much less lineal distance during a given amount of climb than do the elements near the tip, and therefore the relative wind has a good deal steeper downward angle in engaging the elements near the root than it does the elements near the tip. However, as the incidence angle of the blade approaches zero it is desirable to have approximately equal incidence angle over the entire blade, and as incidence angle becomes negative to have the portion of the blade near the root more strongly negative in incidence angle than that near the tip.

As shown in Figure 1, the amount of change of incidence angle for any given change of flapping angle may be made to be very much greater near the root of the blade than near the tip by curving the blade backward toward the tip. The amount of change of incidence angle occasioned by any given change of flapping angle is dependent upon the angle which the radius from axis 1 to the blade element in question makes with the axis of hinge 6. If this angle is sharp the relative amount of change of incidence angle is great; but as the radius from axis of shaft 1 to the blade element approaches a right angle to the axis of hinge 6, the amount of change in the incidence angle of that blade element approaches zero. By curving the blades as shown in Figure 1, the radii from the axis of shaft 1 to the blade elements lying along the inner portion of the blade, make acute angles with hinge axis 6, thereby insuring a very substantial change of incidence angle for any given change of flapping angle of blade up or down about hinge 6. However, the radii from axis 1 to elements of the blade lying near the tip pass so nearly at right angles to the line of the axis of hinge 6 that the angularity of that hinge contributes very little to the change of incidence angle of the blade elements near the tip of the blade.

Therefore the elements near the tip receive the change of incidence occasioned by the swinging of the entire blade about hinge pin 4 plus only a very slight change of incidence due to the flapping of the blade about hinge 6, whereas the blade elements near the root receive approximately the same amount of change of incidence due to the swinging of the blade about hinge 4 and in addition a large increment of change of incidence due to the flapping of the blade about hinge 6. Thus, in vertical climb, there will be a large plus incidence to the blade elements near the root and a very much less plus incidence to the blade elements near the tip; whereas all blade elements can be designed to come back to zero incidence angle approximately simultaneously in auto rotation and powerless descent and any negative incidence angles due to upward flapping of the blade about hinge 6 will be much greater near the root of the blade than they will be near the tip.

When a craft equipped with a rotor such as shown in Figure 1 is advancing horizontally with the rotor spinning, the air speed of any blade on the advancing side will be very much greater than that on the receding side for the reason that the air speed on the advancing side will be equal to the air speed of the craft plus the rotational rate of advance of the blade; whereas the air speed on the receding side will be equal to the rotational advance of the blade minus the air speed of the craft. Since centrifugal force will be substantially the same on the two sides, this results in the blades standing at a much higher flapping angle on the advancing side than on the receding side.

With the hinge arrangement disclosed in my Patent 1,993,701 this would result in a very flat incidence angle for the advancing blade and a very steep positive incidence angle for the receding blade. While this would apparently give better rotational characteristics to the rotor than the usual uniform incidence angle throughout, the conditions controlling the variation in incidence angle during forward flight are so different from those controlling it during vertical ascent or descent, that there is no inherent reason why the optimum amount of change of incidence angle for a given change of flapping angle should be the same in horizontal flight as in vertical flight.

The present invention makes it possible to design the range of incidence angles effective in vertical flight independently of that in horizontal flight and to have the range of incidence angles in vertical flight as much greater than that in horizontal flight as may be desired.

The following considerations will aid in understanding how the present invention accomplishes this. In vertical flight maximum climb is obtained with maximum power on the rotor and with the blades at approximately their minimum flapping angle due, as has already been pointed out, to the upward movement of the craft giving a downward component to the relative wind engaging the blades and thereby bringing them into equilibrium at a low flapping angle. Under these conditions the lag of the blades due to the power being applied will tend to increase the incidence angle, whereas a decrease in flapping angle rotating the blade down about hinge 6 will also tend to increase the incidence angle. Therefore, the effect on incidence angle movement of the blade about hinge 4 and the effect of its movement about hinge 6 are both in the same direction and combine to give a cumulative effect on the incidence angle. Similarly, when the application of power ceases the action of centrifugal force advances the blades about hinge pin 4 thereby decreasing incidence angle, while the dropping of the craft creates an upward relative wind, raising the blade about hinge axis 6 and further decreasing the incidence angle. Typical numerical examples of the flapping angles of equilibrium under climb and powerless descent conditions are developed and set forth in my Patent 1,993,701 above referred to.

In horizontal flight, on the other hand, the advancing blade encounters maximum lift and maximum drag due to its maximum air speed which, without corresponding increase in centrifugal force, gives maximum tendency for the blade to flap upward, combined with the maximum tendency for the blade to lag; therefore the lagging movement about hinge 4 will tend to increase the incidence angle whereas the upward flapping movement about hinge 6 will tend to decrease the incidence angle of the advancing blade. The effects on incidence angle of these two hinges therefore, are subtracted, tending to cancel each other in horizontal flight, whereas they are added together in vertical flight. Therefore, any portion of the desirable change of incidence angle for vertical flight which is obtained due to the angularity of hinge pin 4, will serve to doubly decrease the amount of change of incidence angle in horizontal flight over that obtained in vertical flight, and the designer may, by altering the relative angularity of hinge pin 4 and hinge pin 6, establish his desired range of variation of incidence angle in horizontal flight independently of that in vertical flight.

As has been pointed out, with the blade and hinge arrangements disclosed in my Patent 1,993,701 any resultant force acting in the plane of the blade axis and hinge, tending to rotate the blade about the hinge, would tend to set up marked bending moments in the blade itself and heavy stresses in the hinge. With the single hinge arrangement disclosed, this is due to the fact that the blade would not be free to move with respect to the rotor center in the plane containing the blade axis and the hinge. With the alternative disclosure of that patent, in which the hinge axis can be displaced against spring pressures by the resultant blade reactions when the rotor is driven by power from the engine, the blade would still not be free to move in response to forces tending to rotate it in the plane of the blade axis and hinge until the resultant of such forces became great enough to overcome the force of the springs controlling the displacement of the hinge, so that even with this alternative, the bending moments in the blade and the stresses in the hinge would increase until they reached the value at which the limiting springs yield. In the disclosure of the present invention, on the other hand, no such moments in the blade, or stresses in the hinge, are set up because the blade is free to be displaced about both hinge 6 and hinge 4 within certain ranges of movement which may easily be constructed great enough so that the blade will never reach the limit of its free movement about the hinges during normal flight conditions.

This double hinge arrangement therefore gives the effect of a universal joint in that in whatever plane the blade is prevented from moving about one hinge, it is free to move about the other hinge.

The alternative disclosure of my Patent 1,993,701 discloses a spring controlled means for displacing the equivalent of hinge 6 under the stresses set up by the application of driving power to the rotor. The disclosure of the present invention substitutes the simple hinge pin 4 about which the blade and hinge 6 may be displaced by the application of power to the rotor system and controlled in their displacement by centrifugal force rather than by the spring arrangement shown in the patent referred to. By comparing these two disclosures it will be obvious that the present disclosure provides an unusually simple means of accomplishing the selective displacement of a blade hinge such as hinge 6 by the application of power to the rotor system, as well as a desirably simple and effective means of accomplishing the other objects set forth hereinabove.

The accompanying drawing illustrates a typical embodiment of the invention, with the inner hinge on each blade being approximately vertical but converging upwardly toward the rotor axis at an angle of approximately 5°, and the outer hinge on each blade being inclined upwardly toward its leading end at an angle of approximately 13° to the plane of rotation, and inclined outwardly toward its leading end so as to make an angle averaging approximately 70° with the radius drawn from the rotor axis to the center of pressure of the blade.

With the approximately vertical hinge placed inside the flapping hinge, as shown in the drawing, the skew angle between the flapping hinge and the radius from the rotor axis to the center of pressure of the blade would grow slightly sharper as the lag of the blade increased. It would be entirely within the scope of the present invention to place the flapping hinge inside of the approximately vertical hinge, in which case the increase of blade lag would tend to bring the radius from the rotor axis to the center of pressure of the blade more nearly toward right angles to the flapping hinge, thus decreasing the effective skew of the hinge.

It would be entirely possible to have two approximately vertical hinges for each blade, if desired, one each side of the flapping hinge, and the relative distances of each from the flapping hinge can be so designed as to bring the net change of effective skew of the flapping hinge within any desired limits.

It will be understood that the invention contemplates a wide degree of variation in the angularity of hinge pins 4 and 6 as taught herein, as well as other constructional variations which will occur to those skilled in the art. The invention therefore is to be considered as restricted only insofar as is required by the prior art and by the spirit of the appended claims.

I claim:

1. A rotor system for aircraft of the class described, comprising a rotatably mounted blade support, a plurality of auto-rotatable blades each connected to said support by a hinge having its axis at an acute angle to the longitudinal axis of said blade, the free ends of said blades curving away from the direction of auto-rotation thereof.

2. In a system of the class described, the combination with a rotatable member of a plurality of blades each curved toward its outer portion in the direction away from that of rotational advance, and a plurality of hinges including a hinge having its axis disposed at an acute angle to the longitudinal axis of the blade connecting each of the blades to the rotatable member.

3. In a system of the class described, the combination of a power driven rotatable member and a plurality of blades hinged thereto by hinges disposed at an acute angle with their circle of rotation, said blades being curved rearwardly with respect to the direction of rotation.

4. A rotor system for aircraft of the class described comprising a rotatably mounted blade support, a plurality of autorotatable blades the free ends of which curve away from the direction of autorotation, and means for varying the incidence angles of said blades upon flapping movement thereof comprising a hinge connection between each of said blades and said support, each of said hinge connections being disposed at a substantial angle to all elements of the longitudinal axis of the associated blade.

5. In a system of the class described, the combination with a member rotatable about a substantially vertical axis, of a plurality of blades, a flapping hinge and a drag hinge connecting each of said blades to said member, the axis of each of said hinges being disposed at an acute angle to a line parallel to the perpendicular from any point on the longitudinal axis of the blade to the axis of rotation of said member, and at an acute angle to a plane perpendicular to said axis of rotation.

6. In a system of the class described, the combination with a rotatable member, of a blade having its longitudinal axis curved in plan, and a hinge connecting said blade to said member, said hinge being disposed at an acute angle to a line passing through the hinge and connecting any point on the longitudinal axis of said blade with the axis of rotation of said member.

7. A rotor system for aircraft of the class described comprising a rotatably mounted blade support, a plurality of autorotatable blades each connected to said support by a hinge having its axis fixed at an acute angle to the axis of said support, the free ends of said blades curving away from the direction of autorotation thereof.

8. A rotor system for aircraft of the class described comprising a rotatably mounted blade support, a plurality of autorotatable blades each connected to said support by a plurality of hinges including a hinge having its axis fixed at an acute angle to the axis of said support, the free ends of said blades curving away from the direction of autorotation thereof.

9. In a system of the class described, the combination of a rotatable member, a blade, elements of the axis of which make acuate angles rearwardly with radii connecting them to the center of rotation, and means connecting the blade to the rotatable member comprising a hinge, the leading end of which is further from the axis of rotation of the rotatable member than is the trailing end thereof.

10. In a rotary wing aircraft, a rotary wing system adapted to be rotated in flight from a source of power or optionally freely rotatable comprising a rotatable hub member and a blade hinged to said member by a plurality of hinges comprising one hinge about which flapping movement of the blade primarily takes place, the axis of which hinge is inclined outwardly and forwardly at an acute angle to a line parallel to the general lengthwise axis of the blade, and a second hinge about which drag movement of the blade may take place, the axis of which hinge extends upwardly and inwardly.

11. In a rotary wing aircraft, a rotary wing system adapted to be rotated in flight from a source of power or optionally freely rotatable comprising a rotatable hub member and a blade hinged thereto by two hinges including a flapping hinge, the forward direction of the axis of which with respect to the direction of rotation of the system is angled upwardly forwardly and outwardly, and a drag hinge, the axis of which extends upwardly and inwardly.

12. In a rotary wing aircraft, a rotary wing system adapted to be rotated in flight from a source of power or optionally freely rotatable comprising a rotatable hub member and a blade hinged thereto by a plurality of hinges comprising a flapping hinge, the forward direction of the axis of which with respect to the direction of rotation of the system is angled upwardly forwardly and outwardly, and a drag hinge, the upward direction of the axis of which extends upwardly and inwardly.

13. In a rotary wing aircraft, a rotary wing system adapted to be rotated from a source of power or optionally freely rotatable comprising a rotatable hub member and a blade hinged to said member by a plurality of hinges comprising one hinge about which flapping movement of the blade primarily takes place, the axis of which hinge is inclined outwardly and forwardly at an acute angle to a line parallel to the general lengthwise axis of the blade, and a second hinge about which drag movement of the blade may take place, the axis of which hinge extends upwardly and inwardly.

14. In a rotary wing aircraft, a rotary wing system adapted to be rotated from a source of power or optionally freely rotatable comprising a rotatable hub member and a blade hinged thereto by a plurality of hinges comprising a flapping hinge, the forward direction of the axis of which with respect to the direction of rotation of the system is angled upwardly forwardly and outwardly, and a drag hinge, the upward direction of the axis of which extends upwardly and inwardly.

15. In a rotary wing aircraft, a rotary wing system adapted to be rotated from a source of power or optionally freely rotatable, comprising a rotatable hub member, a blade, and means connecting said blade to the rotatable hub member including a flapping hinge the axis of which is angled upwardly and outwardly in the direction of its rotation, and a drag hinge the axis of which is disposed at an acute angle with reference to a line parallel to the axis of rotation of said hub member.

HAROLD T. AVERY.